(12) United States Patent
Dawson et al.

(10) Patent No.: US 10,696,133 B2
(45) Date of Patent: Jun. 30, 2020

(54) CABIN VENTING SYSTEM AND METHOD FOR AN ELECTRIFIED VEHICLE

(71) Applicant: Ford Global Technologies, LLC, Dearborn, MI (US)

(72) Inventors: Brandon M. Dawson, Royal Oak, MI (US); James J. Gibbons, Milford, MI (US); Thomas M. Gwozdek, Plymouth, MI (US); Edward Popyk, Dearborn, MI (US); Rick Lagerstrom, Huntington Woods, MI (US); Josephine S. Lee, Novi, MI (US); Mark Polster, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1892 days.

(21) Appl. No.: 14/014,541

(22) Filed: Aug. 30, 2013

(65) Prior Publication Data

US 2015/0065026 A1    Mar. 5, 2015

(51) Int. Cl.
| | |
|---|---|
| *B60H 1/24* | (2006.01) |
| *B60H 1/00* | (2006.01) |
| *H01M 10/42* | (2006.01) |
| *H01M 10/52* | (2006.01) |
| *H01M 10/48* | (2006.01) |

(52) U.S. Cl.
CPC ..... *B60H 1/00792* (2013.01); *B60H 1/00385* (2013.01); *B60H 1/00978* (2013.01); *B60H 1/248* (2013.01); *H01M 10/4207* (2013.01); *H01M 10/52* (2013.01); *H01M 10/482* (2013.01); *H01M 10/486* (2013.01); *H01M 2010/4278* (2013.01)

(58) Field of Classification Search
CPC ............ B60H 1/00385; B60H 1/00792; B60H 1/00978; B60H 1/248; B60H 1/00392; B60H 1/004; B60H 1/00278; H01M 10/52
USPC .......................................................... 454/75
See application file for complete search history.

(56) References Cited

U.S. PATENT DOCUMENTS

| | | | | |
|---|---|---|---|---|
| 5,194,038 | A * | 3/1993 | Klomhaus | B60H 1/249 137/512.1 |
| 7,441,414 | B2 * | 10/2008 | Ziehr | B60H 1/00778 165/202 |
| 8,099,221 | B2 * | 1/2012 | O'Leary | B60W 10/06 180/170 |
| 2009/0191804 | A1 * | 7/2009 | Goenka | B60H 1/005 454/75 |
| 2010/0136402 | A1 * | 6/2010 | Hermann | H01M 2/1077 429/120 |
| 2010/0273034 | A1 * | 10/2010 | Hermann | H01M 2/08 429/62 |
| 2010/0326754 | A1 * | 12/2010 | Radermacher | B60K 6/46 180/65.265 |

(Continued)

*Primary Examiner* — Vivek K Shirsat
*Assistant Examiner* — Ko-Wei Lin
(74) *Attorney, Agent, or Firm* — David B. Kelley; Carlson, Gaskey & Olds

(57) ABSTRACT

A method according to an exemplary aspect of the present disclosure includes, among other things, detecting a battery fault of a battery of an electrified vehicle, activating a HVAC system ON, commanding the HVAC system to a fresh air mode, communicating fresh air into a passenger cabin, and expelling battery vent byproducts from the passenger cabin through at least one air extractor vent during key-on or key-off states.

14 Claims, 4 Drawing Sheets

(56) References Cited

U.S. PATENT DOCUMENTS

| | | | |
|---|---|---|---|
| 2011/0059341 A1* | 3/2011 | Matsumoto | B60H 1/00278 429/82 |
| 2011/0165830 A1* | 7/2011 | Smith | B60H 1/00278 454/75 |
| 2013/0291515 A1* | 11/2013 | Gonze | F01N 3/027 60/274 |
| 2016/0133897 A1* | 5/2016 | Schreiber | H01M 2/1077 429/120 |

* cited by examiner

CABIN VENTING SYSTEM AND METHOD FOR AN ELECTRIFIED VEHICLE

TECHNICAL FIELD

This disclosure relates to an electrified vehicle, and more particularly, but not exclusively, to a cabin venting system and method for actively venting battery vent byproducts from a passenger cabin of an electrified vehicle.

BACKGROUND

Hybrid electric vehicles (HEV's), plug in hybrid electric vehicles (PHEV's), battery electric vehicles (BEV's), fuel cell vehicles and other known electrified vehicles differ from conventional motor vehicles in that are powered by one or more electric machines (i.e., electric motors and/or generators) instead of or in addition to an internal combustion engine. High voltage current is typically supplied by one or more batteries that store electrical power for powering the electric machine(s).

The high voltage batteries of an electrified vehicle typically include one or more lithium-ion battery cells. Battery vent byproducts may be expelled from one or more of the lithium-ion battery cells in response to a battery fault during drive as well as during a plug-in charge. These byproducts can migrate into a passenger cabin of the electrified vehicle and therefore may need to be purged to outside atmosphere.

SUMMARY

A method according to an exemplary aspect of the present disclosure includes, among other things, detecting a battery fault of a battery of an electrified vehicle, activating a HVAC system ON, commanding the HVAC system to a fresh air mode, communicating fresh air into a passenger cabin, and expelling battery vent byproducts from the passenger cabin through at least one air extractor vent during key-on or key-off states.

In a further non-limiting embodiment of the foregoing method, the method of detecting includes evaluating voltages and temperature of at least one battery cell of the battery.

In a further non-limiting embodiment of either of the foregoing methods, if the electrified vehicle is on, the step of activating the HVAC system includes communicating a request signal from a first control module to a second control module and communicating a command signal from the second control module to the HVAC system to activate the HVAC system.

In a further non-limiting embodiment of any of the foregoing methods, if the electrified vehicle is off, waking up a first control module to precondition the HVAC system so the HVAC system stays ON during the key-off state.

In a further non-limiting embodiment of any of the foregoing methods, the method of waking up the first control module includes communicating a first wake up signal from a battery electronic control module to the first control module and communicating a second wake up signal from the first control module to a second control module.

In a further non-limiting embodiment of any of the foregoing methods, the method of commanding includes opening a fresh air door of the HVAC system and actuating a fan of the HVAC system to an on position.

In a further non-limiting embodiment of any of the foregoing methods, the steps of opening and actuating are performed for a predefined amount of time.

In a further non-limiting embodiment of any of the foregoing methods, the step of commanding includes opening a fresh air door of the HVAC system for a predefined amount of time.

In a further non-limiting embodiment of any of the foregoing methods, the step of commanding includes actuating a fan of the HVAC system to an on position at a predefined speed and for a predefined amount of time.

In a further non-limiting embodiment of any of the foregoing methods, the step of communicating includes drawing in the fresh air from a vehicle exterior.

In a further non-limiting embodiment of any of the foregoing methods, the method includes deactivating the HVAC system after the step of expelling.

In a further non-limiting embodiment of any of the foregoing methods, the method includes deactivating the HVAC system after a predefined amount of time.

A cabin venting system according to another exemplary aspect of the present disclosure includes, among other things, a battery that includes a battery electronic control module and a second control module in communication with the battery electronic control module. A HVAC system is operable in a fresh air mode in response to a command signal from the second control module. At least one air extractor vent is configured to expel battery vent byproducts in response to operation of the HVAC system in the fresh air mode.

In a further non-limiting embodiment of the foregoing cabin venting system, the second control module is a powertrain control module or a combined body control module/powertrain control module.

In a further non-limiting embodiment of either of the foregoing cabin venting systems, the HVAC system includes a fresh air door and a fan.

In a further non-limiting embodiment of any of the foregoing cabin venting systems, the fresh air door is movable to an open position and the fan is actuable to an on position in response to the command signal.

An electrified vehicle according to an exemplary aspect of the present disclosure includes, among other things, a passenger cabin and a cabin venting system for purging the passenger cabin. The cabin venting system includes a battery having a first control module, a second control module in communication with the first control module and a HVAC system operable in a fresh air mode in response to a command signal from either the first control module or the second control module to expel battery vent byproducts from the passenger cabin.

In a further non-limiting embodiment of the foregoing electrified vehicle, the first control module is a battery electronic control module and the second control module is a powertrain control module.

In a further non-limiting embodiment of either of the foregoing electrified vehicles, the HVAC system includes a control unit, a fresh air door and a fan.

In a further non-limiting embodiment of any of the foregoing electrified vehicles, at least one air extractor vent is configured to expel the battery vent byproducts in response to operation of the HVAC system in the fresh air mode.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a cabin venting system and method for use in an electrified vehicle. An exemplary cabin venting system is configured to selectively command an HVAC system to continue operating in a fresh air mode in order to expel battery vent byproducts from a passenger cabin of the electrified vehicle after a transition to a key-off state without a vehicle operator turning the key off. The HVAC may continue to communicate fresh air into the passenger cabin in order to expel the battery byproducts through at least one air extractor vent. The cabin venting system of this disclosure is an active system that can control the HVAC system during a battery fault at drive or during a plug-in charge without requiring any direct vehicle operator participation. These and other features are discussed in greater detail herein.

Figure 1:
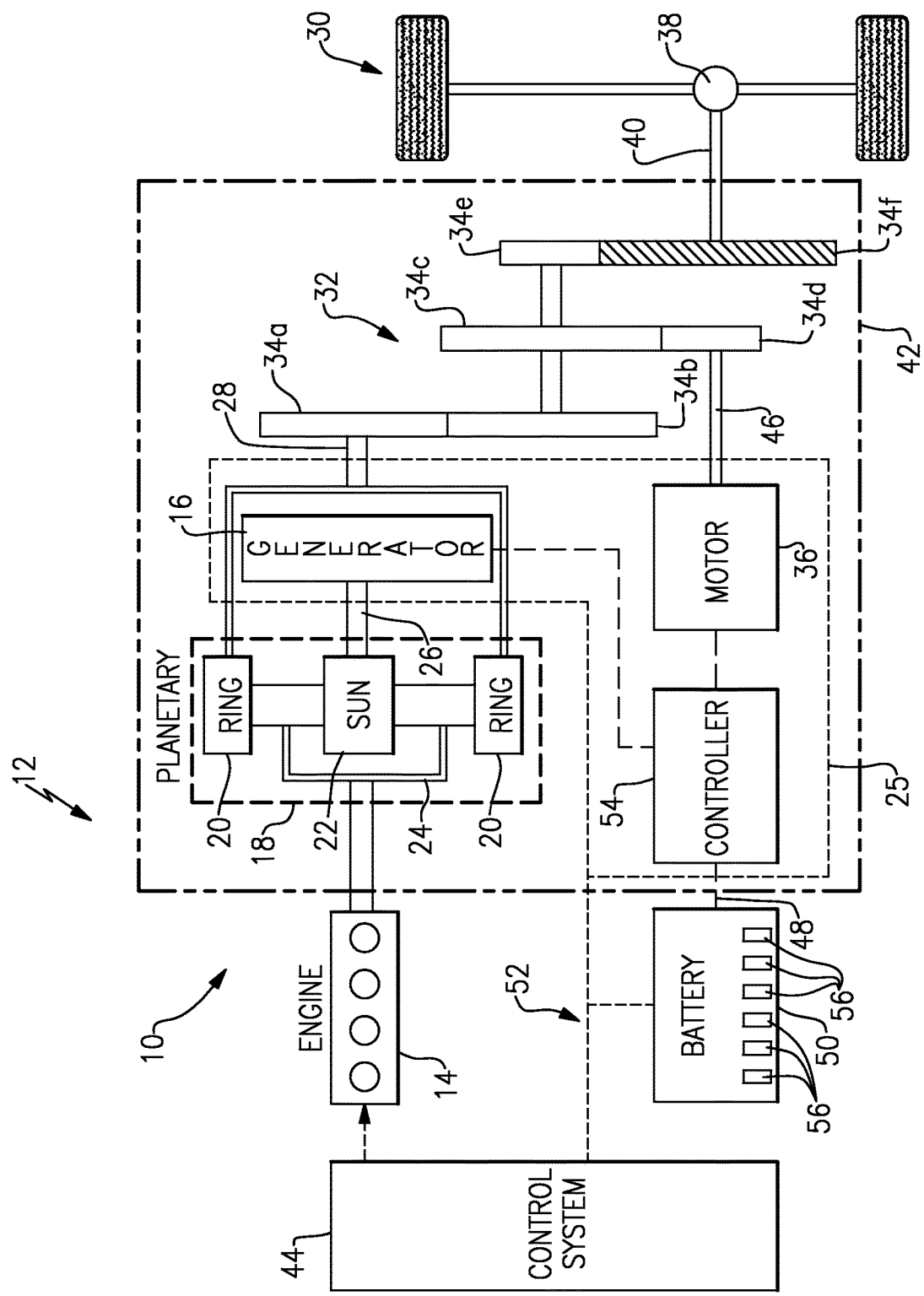
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a powersplit system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electrified vehicle 12.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

The battery 50 may include one or more battery cells 56, such as lithium-ion battery cells. The battery cells 56 are shown schematically in FIG. 1. The battery cells 56 may overheat or be damaged as a result of a vehicle accident or other fault in the vehicle or battery. One or more of the damaged battery cells 56 can emit battery vent byproducts in response to the battery fault. The battery vent byproducts can include carbon monoxide, hydrogen and/or other byproducts that may need removed from the electrified vehicle 12 during drive or plug-in charge.

Figure 2:
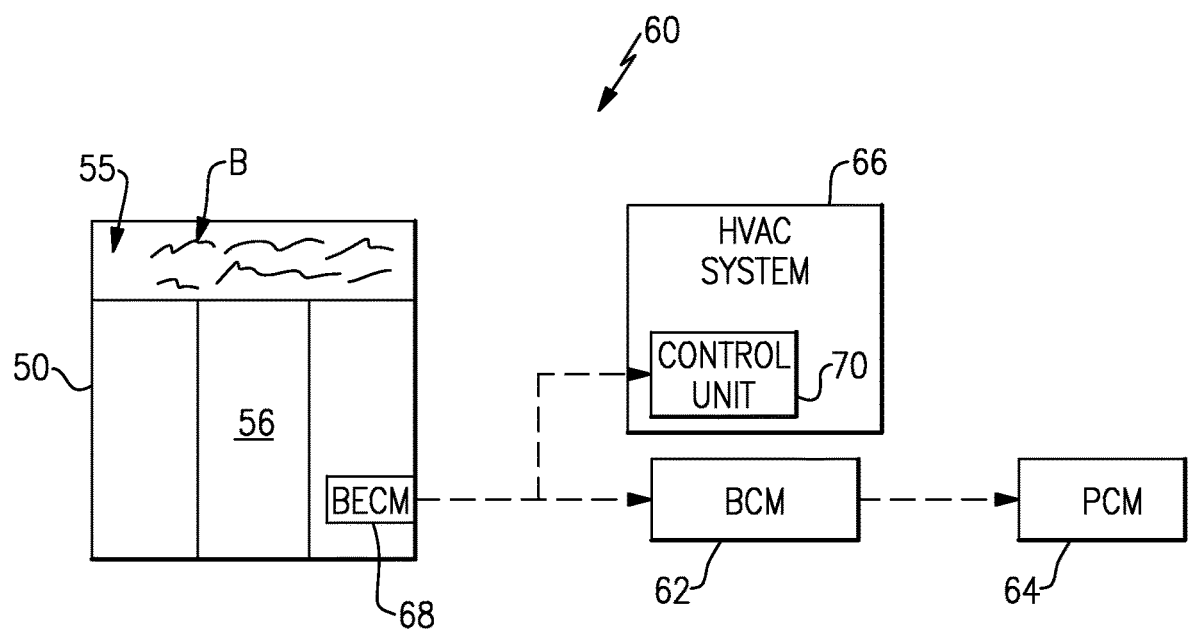
FIG. 2 illustrates a cabin venting system that can be incorporated into an electrified vehicle.

FIG. 2 schematically illustrates a block diagram of a cabin venting system 60 that can be incorporated into an electrified vehicle, such as electrified vehicle 12 of FIG. 1. The cabin venting system 60 may be activated in response to a battery fault in order to expel battery vent byproducts B from a passenger cabin (see FIGS. 3 and 4) of the electrified vehicle 12. For example, the cabin venting system 60 may employ a battery 50, such as the high voltage battery of the electrified vehicle 12, a body control module (BCM) 62, a powertrain control module (PCM) 64, and a HVAC system 66 that operate together to perform a cabin air purge in response to a battery fault of the battery 50. The BCM 62 and the PCM 64 also perform other functions related to an electrified vehicle operation beyond those involving the cabin venting system 60. In another embodiment, the BCM 62 and the PCM 64 are a combined body control module/powertrain control module.

One or more battery cells 56 of the battery 50 may emit battery vent byproducts B in response to a battery fault. The battery vent byproducts B can escape from the battery cell(s) 56 into a venting chamber 55 of the battery 50. The battery vent byproducts B are taken from the venting chamber 55 and sent to outside atmosphere (i.e., exterior to the vehicle) by the cabin venting system 60.

The battery 50 includes a battery electronic control module (BECM) 68 (i.e., a first control module) for monitoring the status of the battery 50 and for requesting the activation of the cabin venting system 60 over a controlled area network (CAN). For example, depending upon whether the electrified vehicle 12 is in a key-on or a key-off condition, the BECM 68 can communicate request signals to either the BCM 62 (i.e., a second control module) or the PCM 64 (i.e., a third control module), which may then send command signals to the HVAC system 66. In one embodiment, during a key-on condition, the BECM 68 communicates a request signal to the PCM 64 and the PCM 64 then communicates a command signal to a control unit 70 of the HVAC system 66 in order to activate the HVAC system 66 for responding to a battery fault. Alternatively, during a key-off condition, which may occur during plug-in charge of the battery 50, the BECM 68 may communicate a signal to the BCM 62 to wake-up the PCM 64 for enabling pre-conditioning so that the BCM 62 will enable the blower relays to force the HVAC system 66 to remain "ON" during the key-off state. The BECM 68, the BCM 62, the PCM 64 and the HVAC system 66 each include the necessary hardware and software for utilizing network management to communicate with one another.

Figure 3:
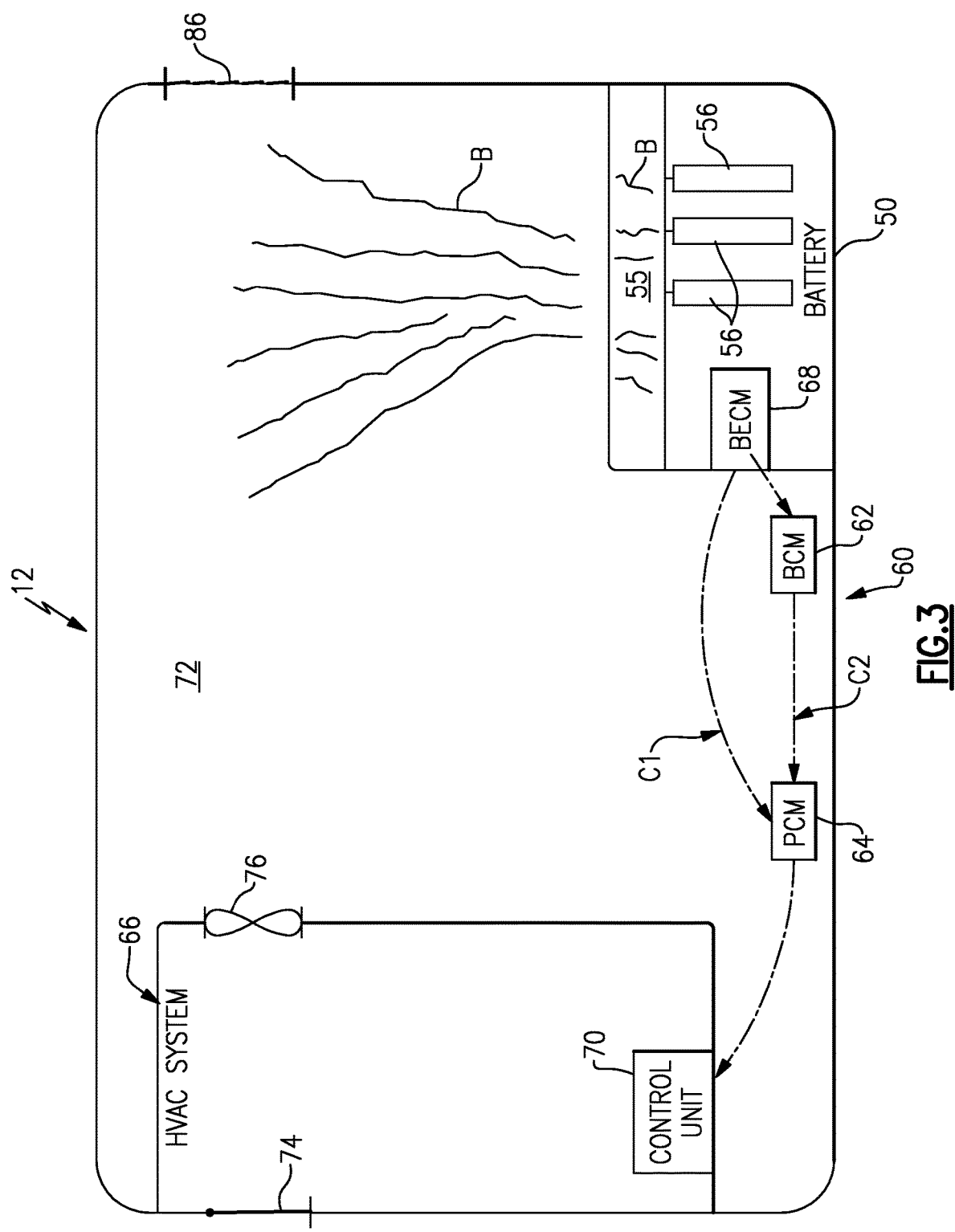
FIG. 3 schematically illustrates a method for actively venting a passenger cabin of an electrified vehicle.
Figure 4:
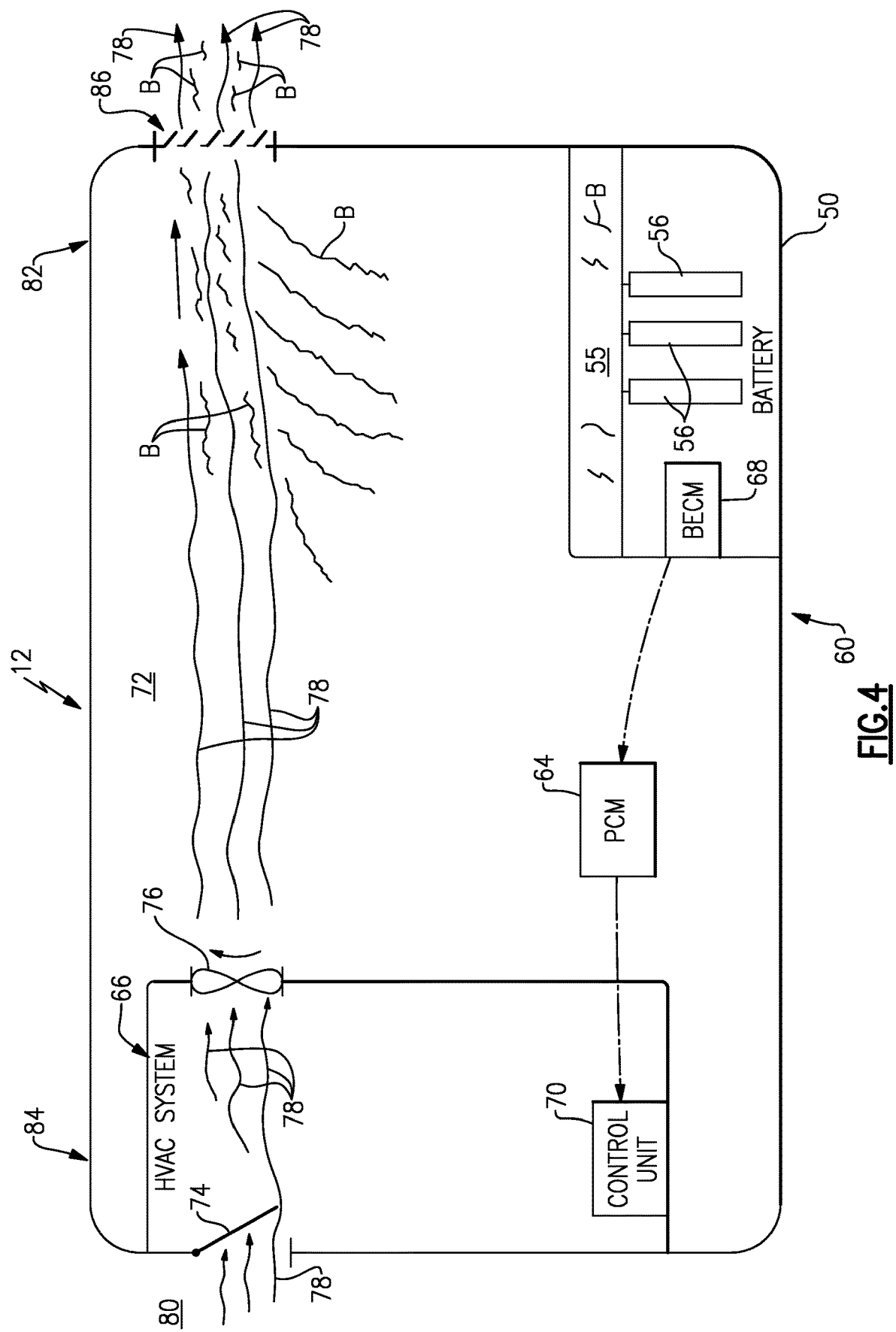
FIG. 4 schematically illustrates additional features of a method for actively venting a passenger cabin of an electrified vehicle.

FIGS. 3 and 4, with continued reference to FIGS. 1 and 2, schematically illustrate a method of utilizing the cabin venting system 60 to actively vent a passenger cabin 72 of an electrified vehicle 12. For example, the method can be performed in order to expel battery vent byproducts B that have entered the passenger cabin 72 from the venting chamber 55 of the battery 50 after a battery fault. As further detailed below, a detection and communication portion of the method is shown in FIG. 3, and FIG. 4 illustrates a mitigation portion of the exemplary method.

Referring to FIG. 3, the method begins in response to detecting a battery fault of the battery 50. Battery vent byproducts B may escape into the passenger cabin 72 in response to a battery fault and therefore may need purged from the passenger cabin 72. The BECM 68 of the battery 50 can detect battery faults. In one embodiment, the BECM 68 evaluates voltages and temperatures of one or more battery cells 56 of the battery 50 in order to detect whether a battery fault, such as a battery cell venting event, has occurred. The BECM 68 may be programmed with the necessary algorithms for performing such an evaluation.

In response to detecting a battery fault, the BECM 68 may use network management to communicate with other components of the cabin venting system 60. For example, if the electrified vehicle 12 is on, the BECM 68 communicates a command signal to the control unit 70 over a first communication path C1 through the PCM 64 to activate the HVAC system 66. Alternatively, if the electrified vehicle 12 is in a key-off state, the BECM 68 may communicate a first wake up signal to the BCM 62 over a second communication path C2. The BCM 62 may then communicate a second wake up signal to the PCM 64 over the second communication path C2. Finally, one awoken, the PCM 64 communicates a command signal to control unit 70 of the HVAC system 66 to enable preconditioning of the HVAC system 66.

In the embodiment shown by FIG. 3, a fresh air door 74 and a fan 76 of the HVAC system 66 are in closed and off positions, respectively. In addition, an air extractor vent 86 of the HVAC system 66 is closed.

FIG. 4 schematically illustrates a mitigation portion of the method for expelling battery vent byproducts B that have entered the passenger cabin 72 after a battery fault. The mitigation portion occurs in response to receiving a request from the BECM 68 to the PCM 64. The PCM 64 may accept the request by commanding the HVAC system 66 to activate the cabin venting system 60. Once a command signal has been received by the control unit 70, the HVAC system 66 is activated and commanded to a fresh air mode. In the fresh air mode, the fresh air door 74 is moved to an open position to permit fresh air 78 to enter inside the electrified vehicle 12. In one embodiment, the fresh air 78 is drawn from a vehicle exterior 80 that is completely remote from the passenger cabin 72.

The fan 76 of the HVAC system 66 may also be actuated to an "on" position in response to receiving one of the command signals from either the BECM 68 or the PCM 64. The fan 76 may rotate to communicate the fresh air 78 into the passenger cabin 72. The fresh air 78 is circulated through the passenger cabin 72 where it intermixes with the battery vent byproducts B. The fan 76 may be operated at a predefined speed for forcing the fresh air 78 through the passenger cabin 72.

In one embodiment, the HVAC system 66 is located near a front 84 of the electrified vehicle 12 and one or more air extractor vents 86 are located near a rear 82 of the electrified vehicle 12. Although only one vent is shown, the cabin venting system 60 of the electrified vehicle 12 may be equipped with numerous air extractor vents 86 located throughout the electrified vehicle 12.

The fan 76 forces the fresh air 78 and the battery vent byproducts B through the passenger cabin 72 toward the rear 82 of the electrified vehicle 12. The battery vent byproducts B may be expelled through at least one air extractor vent 86, thereby purging the battery vent byproducts B from the passenger cabin 72. In one embodiment, the air extractor vents 86 are plastic flapper valves, although other configurations are also contemplated. In other words, the battery vent byproducts B are not expelled by lowering the windows of the electrified vehicle 12, which may be undesirable in certain climates or during certain situations, but are instead displaced through the air extractor vents 86 without requiring any active vehicle operator participation.

The fresh air door 74 may remain open and the fan 76 left in the "on" position for a predefined amount of time. The predefined amount of time may vary depending on the amount of battery vent byproducts B that have entered the passenger cabin 72. In one non-limiting embodiment, the predefined amount of time is approximately 90 seconds. However, other durations are contemplated as within the scope of this disclosure. The HVAC system 66 may be automatically deactivated once the predefined amount of time has expired and/or the battery vent byproducts B have been purged from the passenger cabin 72.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   detecting a battery fault of a battery of an electrified vehicle;
   activating a HVAC system ON;
   commanding the HVAC system to a fresh air mode;
   communicating fresh air into a passenger cabin; and
   expelling battery vent byproducts from the passenger cabin through at least one air extractor vent during key-on or key-off states,
   wherein the battery vent byproducts are not expelled by lowering any windows of the electrified vehicle but are instead expelled through the at least one air extractor vent without requiring any active vehicle operator participation,
   wherein, during the key-on state, the method comprises communicating a first command signal over a first communication path that extends from a battery electronic control module, to a powertrain control module, and then to a control module of the HVAC system to activate the HVAC system; and
   where, during the key-off state, the method comprises communicating a first wake up signal from the battery electronic control module to a body control module over a second communication path, then communicating a second wake up signal to the powertrain control module over the second communication path, and then communicating a second command signal from the powertrain control module to the control unit of the HVAC system to activate the HVAC system.

2. The method as recited in claim 1, wherein the step of detecting includes evaluating voltages and temperature of at least one battery cell of the battery.

3. The method as recited in claim 1, wherein the step of commanding includes:
   opening a fresh air door of the HVAC system; and
   actuating a fan of the HVAC system to an on position.

4. The method as recited in claim 3, wherein the steps of opening and actuating are performed for a predefined amount of time.

5. The method as recited in claim 1, wherein the step of commanding includes opening a fresh air door of the HVAC system for a predefined amount of time.

6. The method as recited in claim 1, wherein the step of commanding includes actuating a fan of the HVAC system to an on position at a predefined speed and for a predefined amount of time.

7. The method as recited in claim 1, wherein the step of communicating includes drawing in the fresh air from a vehicle exterior.

8. The method as recited in claim 1, comprising the step of deactivating the HVAC system after the step of expelling.

9. The method as recited in claim 1, comprising the step of deactivating the HVAC system after a predefined amount of time.

10. The method as recited in claim 1, wherein the at least one air extractor vent is a plastic flapper valve that includes a plurality of movable flaps.

11. The method as recited in claim 1, wherein the battery vent byproducts are expelled through a plurality of air extractor vents.

12. The method as recited in claim 11, wherein the plurality of air extractor vents are located throughout the electrified vehicle.

13. The method as recited in claim 1, wherein expelling the battery vent byproducts from the passenger cabin through the at least one air extractor vent includes:
    forcing a plurality of flaps of the at least one air extractor open with the fresh air.

14. A method, comprising:
    expelling battery vent byproducts from a passenger cabin of an electrified vehicle during both key-on and key-off states of the electrified vehicle in response to a battery fault, wherein the expelling includes forcing the battery vent byproducts through at least one air extractor vent,
    wherein the battery vent byproducts are not expelled by lowering any windows of the electrified vehicle but are instead expelled through the at least one air extractor vent without requiring any active vehicle operator participation,
    wherein, during the key-on state, the method comprises communicating a first command signal over a first communication path that extends from a battery electronic control module, to a powertrain control module, and then to a control module of the HVAC system to activate the HVAC system; and
    wherein, during the key-off state, the method comprises communicating a first wake up signal from the battery electronic control module to a body control module over a second communication path, then communicating a second wake up signal to the powertrain control module over the second communication path, and then communicating a second command signal from the powertrain control module to the control unit of the HVAC system to activate the HVAC system.

* * * * *